United States Patent
Tseng et al.

(10) Patent No.: US 8,656,511 B2
(45) Date of Patent: Feb. 18, 2014

(54) METHOD FOR ATTACHING A PARTICLE TO A SCANNING PROBE TIP THROUGH EUTECTIC BONDING

(75) Inventors: Fan Gang Tseng, Hsinchu (TW); Hui Wen Cheng, Hsinchu (TW); Wun Yuan Jheng, Taipei County (TW)

(73) Assignee: National Tsing Hua University, Hsinchu (TW)

( * ) Notice: Subject to any disclaimer, the term of this patent is extended or adjusted under 35 U.S.C. 154(b) by 232 days.

(21) Appl. No.: 12/763,614

(22) Filed: Apr. 20, 2010

(65) Prior Publication Data

US 2010/0275335 A1    Oct. 28, 2010

(30) Foreign Application Priority Data

Apr. 23, 2009  (TW) ............................... 98113416 A

(51) Int. Cl.
*G01Q 60/40*  (2010.01)
*G01Q 60/38*  (2010.01)
*G01Q 70/18*  (2010.01)

(52) U.S. Cl.
USPC .................................. 850/40; 850/41; 850/61

(58) Field of Classification Search
USPC ............ 850/52, 56, 57, 58, 59, 60, 61, 40, 41
See application file for complete search history.

(56) References Cited

U.S. PATENT DOCUMENTS

| | | | |
|---|---|---|---|
| 4,987,312 A * | 1/1991 | Eigler | 977/858 |
| 5,441,343 A * | 8/1995 | Pylkki et al. | 850/50 |
| 5,742,307 A * | 4/1998 | Watrobski et al. | 347/62 |
| 5,874,668 A * | 2/1999 | Xu et al. | 850/40 |
| 6,730,905 B2 * | 5/2004 | Nakagawa et al. | 850/61 |
| 6,743,408 B2 * | 6/2004 | Lieber et al. | 977/750 |
| 6,987,277 B2 * | 1/2006 | Baur et al. | 850/26 |
| 7,357,018 B2 * | 4/2008 | Curry et al. | 73/105 |
| 7,635,392 B2 * | 12/2009 | Bloess et al. | 850/56 |
| 7,814,565 B2 * | 10/2010 | Kim et al. | 850/29 |
| 7,818,816 B1 * | 10/2010 | Reppert et al. | 850/1 |
| 7,917,966 B2 * | 3/2011 | Kim et al. | 850/58 |
| 2001/0021570 A1 * | 9/2001 | Lin et al. | 438/455 |
| 2001/0044106 A1 * | 11/2001 | Henderson et al. | 435/6 |
| 2005/0017171 A1 * | 1/2005 | Samuelson et al. | 250/306 |
| 2007/0025907 A1 * | 2/2007 | Rezeq et al. | 423/447.3 |
| 2007/0221840 A1 * | 9/2007 | Cohen et al. | 250/306 |
| 2009/0045336 A1 | 2/2009 | Bloess et al. | |
| 2009/0293162 A1 * | 11/2009 | Cohen et al. | 850/40 |
| 2010/0251439 A1 * | 9/2010 | Amro et al. | 850/40 |

FOREIGN PATENT DOCUMENTS

CN         101040346         9/2007

OTHER PUBLICATIONS

Tang et al. (vol. 46, No. 11 of the "Chinese Science Bulletin" Jun. 2001).*
"Single-Nanoparticle-Terminated Tips for Scanning Probe Microscopy," Langmuir (Letter), 2006, 22(7), pp. 2931-2934.

(Continued)

*Primary Examiner* — Phillip A Johnston
*Assistant Examiner* — Brooke Purinton
(74) *Attorney, Agent, or Firm* — WPAT, P.C.; Anthony King

(57) ABSTRACT

A method for attaching a conductive particle to the apex of a probe tip comprises the steps of: moving the apex of a probe tip close to a conductive particle and applying a bias voltage between the probe tip and the conductive particle so that the conductive particle can permanently attach to the apex. The method uses only a bias voltage to transfer and attach conductive particles to the apex of a probe tip, and no surface treatment of the probe tip is required.

18 Claims, 6 Drawing Sheets

(56) References Cited

OTHER PUBLICATIONS

Okamoto, T. et al., titled "Photocatalytic deposition of a gold nanoparticle onto the top of a SiN cantilever tip," Journal of Microscopy 2002, (2001): 101-103.

Hwang, Ing-Shouh. "Scanning Probe Microscopy: Principles and Applications", Office Action for counterpart TW Application No. 098113416 dated Sep. 3, 2013.

Office Action for counterpart TW Application No. 098113416 dated Sep. 3, 2013 citing: US 2009/0045336, US 2007/0221840, US 5874668, "Scanning Probe Microscopy: Principles and Applications", CN 101040346, US 6987277, US 2001/0044106, and US 5441343.

English Translations of Abstracts of: CN101040346 and "Scanning Probe Microscopy: Principles and Applications", both cited in Office Action for counterpart TW Application No. 098113416.

English Translation Summary of Office Action for counterpart TW Application No. 098113416 dated Sep. 3, 2013 citing: US 2009/0045336, US 200710221840, US 5874668, "Scanning Probe Microscopy: Principles and Applications", CN 101040346, US 6987277, US 200110044106, and US 5441343.

\* cited by examiner

METHOD FOR ATTACHING A PARTICLE TO A SCANNING PROBE TIP THROUGH EUTECTIC BONDING

BACKGROUND OF THE INVENTION

1. Field of the Invention

The present invention relates to a probe and a method for attaching a particle to the apex of a probe tip, and relates more particularly to a probe and a method for attaching a conductive particle to the apex of a probe tip with the application of a bias voltage.

2. Description of the Related Art

Scanning probe microscopy (SPM) is applied for depiction or measurement of the details of fine-scale surface features and material characteristics, and such depiction or measurement is usually performed using a sharp probe tip to scan a target surface.

The probe tip is fixed to one end of a cantilever beam such that the probe tip can move following the profile of a target surface by means of the cantilever beam while scanning. During scanning, the probe tip moves up and down due to the weak interaction forces between atoms on the apex of the probe tip and on the target surface. By measuring the distances of the up-and-down movement, the profile of the target surface can be depicted or the surface characteristics of the target surface can be measured.

The resolution of an SPM tool is determined by the size of the apex of a probe tip. When the radius of curvature of the apex of a probe tip is smaller, the resolution of measurement is higher. If a probe tip with an apex having radius of curvature larger than the particle diameter of a molecule is utilized to perform measurement, the probe tip can only measure the average of the interaction expression of several molecules. Therefore, in order to measure the characteristics of a molecule, the size of the apex of a probe tip should be matched to the size of the target molecule. To achieve this, techniques for the attachment of a micro-particle or a nanoparticle have recently been the focus of much development.

Using a self assembly monolayer (SAM) as an adhesion means to attach a nanoparticle to the apex of a probe tip is one of several traditional techniques. For example, a paper by Vakarelski, I. U. et al., titled "Single-Nanoparticle-Terminated Tips for Scanning Probe Microscopy," Langmuir (Letter), 2006, 22(7), pp 2931-2934, teaches a method that a colloidal gold nanoparticle of several dozen nanometers is attached to the top of an SPM probe tip using a wet chemistry procedure. However, the method requires several chemical processes to form an attach layer on the surface of the probe tip, and these chemical processes may increase the cross sectional area and the surface roughness of the probe tip. Furthermore, to attach nanoparticles of different materials or to use a probe tip of different material, different SAMs are required so that the application of the method is inconvenient. In addition, to attach a single nanoparticle to the top of a probe tip by the method requires careful control of parameters such as the concentration of nanoparticle suspension, the probe tip immersion time, and the method of immersing the probe tip, and such parameters are difficult to control during mass production.

A paper by Okamoto, T. et al., titled "Photocatalytic deposition of a gold nanoparticle onto the top of a SiN cantilever tip," Journal of Microscopy 2002, (2001): 101-103, discloses a method that initially coats a titanium dioxide layer on the surface of a probe tip, and then exposes the titanium dioxide layer immersed in a solution including gold ions to light. When the titanium dioxide layer immersed in a solution including gold ions is subject to optical exposure, the excited electrons in the conduction band reduce gold ions into gold metal. Illumination by an evanescent wave generated with a total reflection configuration limits the deposition region to the very tip. Because the method requires an illumination system that can generate the evanescent wave and equipment for depositing titanium oxide, the manufacturing cost of the probe tip fabricated by the method is high. In addition, the method cannot precisely control the size of the deposited gold particle, and therefore, it is difficult to maintain good quality control.

In summary, there is no method that can be applied to attach a particle to the top of a probe tip that has no unwanted effects and that is cost effective for utilization by the industry.

SUMMARY OF THE INVENTION

The present invention provides a scanning probe and a method for attaching a conductive particle to the apex of the probe tip of the scanning probe. The method uses a bias voltage to directly move and attach a conductive particle to the apex of the probe tip of a scanning probe. The method requires no surface treatment of the probe tip and no expensive equipment, and can correctly and accurately attach a conductive particle to the apex.

The present invention proposes a method for attaching a conductive particle to the apex of the probe tip of a scanning probe, which comprises the steps of: moving the apex of a probe tip close to a conductive particle, and applying a bias voltage between the probe tip and the conductive particle so as to firmly attach the conductive particle to the apex of the probe tip.

In one embodiment, the step of moving the apex of a probe tip and the step of applying a bias voltage are performed simultaneously. The step of applying a bias voltage includes steps of applying a negative voltage to the probe tip and applying a positive voltage to the conductive particle.

The present invention proposes a scanning probe, which comprises a probe tip and a conductive particle. The probe tip includes an apex, and the conductive particle is fixed to the apex, wherein the conductive particle is eutectic bonded to the apex of the probe tip.

Compared with prior art methods, the surface of the probe tip does not need to be treated to have a particle attachable layer so that the configuration of the outer surface of the probe tip does not change. Because there is no requirement for surface treatment of the probe tip, the complex process steps for surface treatment can be omitted and the manufacturing cost reduced. The method of the present invention can be performed with simple equipment so as to have a low cost advantage. The method of the present invention controls the apex to directly engage the target conductive particle so that the conductive particle can be correctly attached to the apex of the probe tip, and therefore can achieve good yield. In contrast, the prior art methods cannot control a particle effectively to attach it to the preferred location so that good yield cannot be achieved.

To better understand the above-described objectives, characteristics and advantages of the present invention, embodiments, with reference to the drawings, are provided for detailed explanation.

BRIEF DESCRIPTION OF THE DRAWINGS

The invention will be described according to the appended drawings in which.

DETAILED DESCRIPTION OF THE INVENTION

Figure 1:
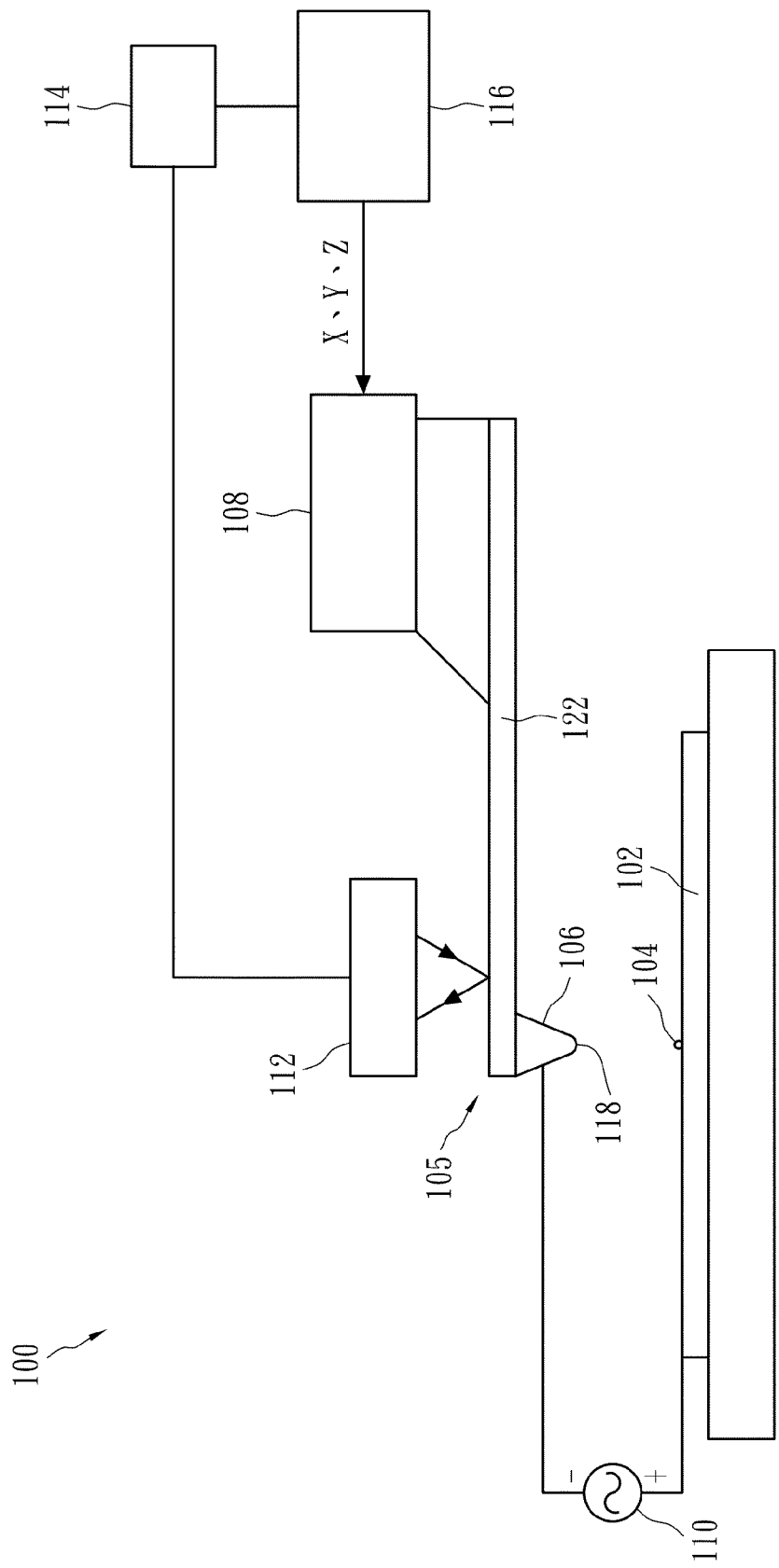
FIG. 1 shows an apparatus for permanently attaching a conductive particle to the apex of a probe tip according to one embodiment of the present invention.

FIG. 1 shows an apparatus 100 for firmly attaching a conductive particle to the apex of a probe tip according to one embodiment of the present invention. The apparatus 100 for firmly attaching a conductive particle to the apex of a probe tip is configured to attractively and firmly attach a conductive particle 104 placed on the surface of a conductive substrate 102 to the apex of a probe tip 106, which comprises a probe drive device 108, a waveform generator 110, an analysis circuit 114, and a controller 116. The cantilever arm 122 of the scanning probe 105 is coupled to the probe drive device 108, which is configured to make the probe tip 106 stationary and to move the probe tip 106 during a scanning process. The waveform generator 110 electrically coupled to the probe tip 106 and the conductive substrate 102 is configured to apply a bias voltage between the probe tip 106 and the conductive substrate 102 such that when a bias voltage is applied between the probe tip 106 and the conductive substrate 102, the probe tip 106 is moved to approach the conductive particle 104 by the probe drive device 108 in order to attach the conductive particle 104 to the apex of the probe tip 106.

The conductive substrate 102 can be made of a conductive material, and the roughness of the surface thereof must be sufficiently low so that the conductive particle 104 can be identified from a scanned image. The roughness of the surface has a relative relationship with the particle diameter of the conductive particle 104. Namely, when the particle diameter is larger, the roughness is allowed to be higher, and more specifically, the relative relationship can be defined using a ratio number. For example, the roughness of the surface is less than one-half of the average particle diameters of the conductive particles 104. In the present embodiment, the conductive substrate 102 is a polished silicon wafer, the surface roughness of which is less than 1 nanometer.

Two types of particles, a micro-particle or a nanoparticle, can be used as a conductive particle 104, and the choice therebetween depends on the resolution required by the application. The material of the conductive particle 104 can be gold, silver, platinum, aluminum, tungsten, nickel, and the like, or an alloy of aforementioned metal elements such as chromium-gold alloy, chromium-cobalt alloy, titanium-platinum alloy, and iridium-platinum alloy. In the present embodiment, the conductive particle 104 is a gold nanoparticle having the particle diameter in the range of from 1.8 nanometers to 40 nanometers.

The shape of the cantilever arm 122 of the scanning probe 105 can be a V shape or a rectangular shape, and the probe tip 106 may have a pyramid shape. The material of the probe tip 106 can be silicon or silicon nitride. The surface of the probe tip 106 can be coated with a metal layer, the material of which may include iridium-platinum alloy.

The probe drive device 108 may use a piezoelectric material as a driving method thereof, and the piezoelectric material may be piezoceramics. A measurement device 112 for measuring the deflection of the cantilever arm of the scanning probe 105 provides measured signals. The analysis circuit 114 processes the signals and transmits processed signals to the controller 116, and the controller 116 drives the probe drive device 108 according to the processed signals so that the probe tip 106 can be controlled to move along any of the XYZ axes. The measurement device 112 can be a laser-based measurement device.

FIGS. 2A-2D are schematic side views illustrating the method for permanently attaching a conductive particle to the apex of the probe tip of a scanning probe according to one embodiment of the present invention. The features in FIGS. 2A-2D are not drawn correctly to scale. The particle diameter of the conductive particle 104 can be in the range of from 2 nanometers to 10 micrometers; the apex 118 can have a size in the range of from 10 nanometers to 50 nanometers, or can be a planar end having a diameter of micrometers; and the height of the apex 118 is in the range of from 10 micrometers to 30 micrometers. The waveform generator 110 is used to apply a bias voltage between the probe tip 106 and the conductive substrate 102. The bias voltage causes the probe tip 106 and the conductive substrate 102 to have opposite voltage polarities. Due to the opposite voltage polarities, a static electrical force is generated between the probe tip 106 and the conductive substrate 102 such that when the apex 118 is moved sufficiently close to the conductive particle 104, the conductive particle 104 is moved by the attraction of the force of static electricity from the conductive substrate 102 to firmly attach to the surface of the apex 118.

The present invention discloses a method for attaching a conductive particle to the apex of the probe tip of a scanning probe, which initially disperses a plurality of conductive particles 104 on a conductive substrate 102. Several liquid drops of a dilute colloid solution containing conductive particles 104 are separately distributed over the surface of the conductive substrate 102. The conductive substrate 102 is then placed undisturbed for several minutes until the surface is dried out. The dilute solution can be prepared by adding a volatile liquid to a colloid solution for complete drying, and the volatile liquid can be ethanol. The dilution factor can depend on the requirement of a user. In the present embodiment, the dilute solution is prepared by adding ethanol to a gold colloid solution (available on the market) with a dilution factor of 1000.

Figure 2A:
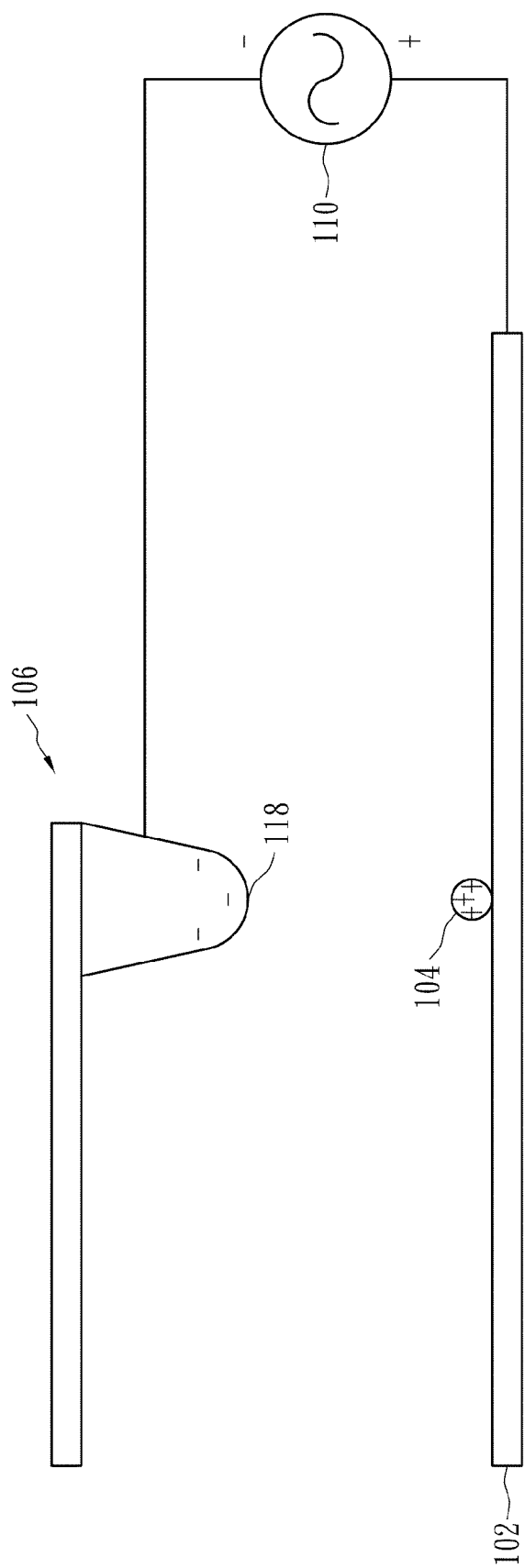
FIGS. 2A-2D are schematic side views illustrating the method for permanently attaching a conductive particle to the apex of the probe tip of a scanning probe according to one embodiment of the present invention.
Figure 2B:
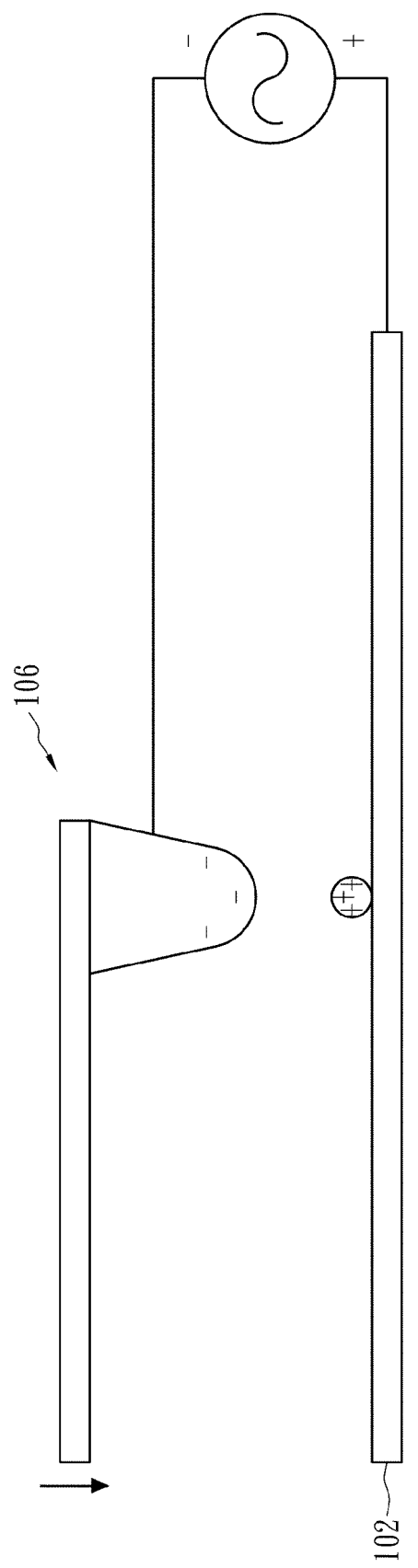
Figure 3:
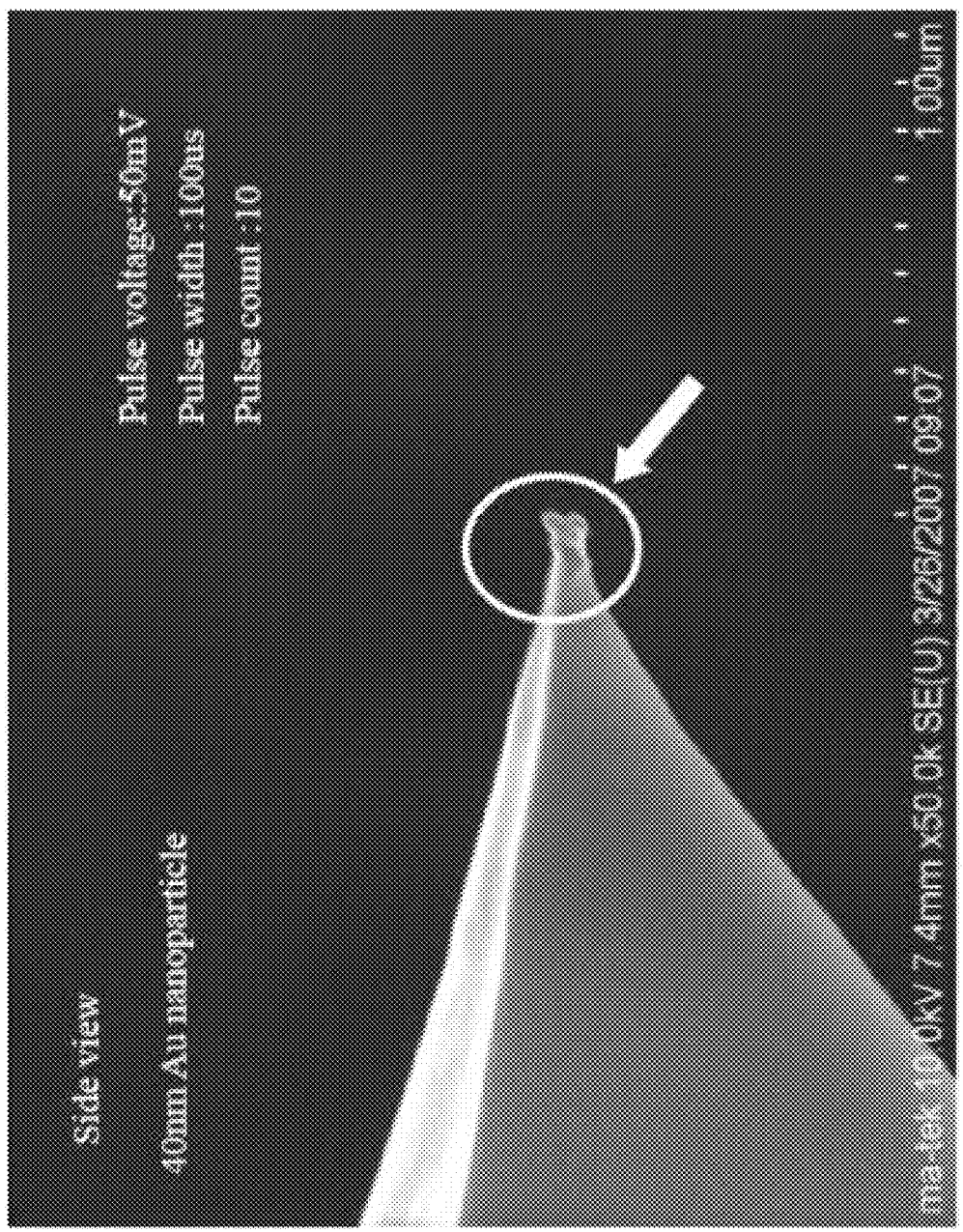
FIG. 3 is an SEM photo showing a gold nanoparticle attached to the apex of a probe tip according to one embodiment of the present invention.

Next, an atomic force microscope (AFM) is used to scan the surface of the conductive substrate 102 to obtain a surface profile image, by which the locations of conductive particles 104 can be identified. Thereafter, the probe tip 106 of the AFM is moved above one of the conductive particles 104. Next, a bias voltage is applied between the probe tip 106 and the conductive substrate 102. When the bias voltage is applied, a force spectrum is used to control the time of contact between the probe tip 106 and the conductive particle 104 as shown in FIG. 2B. The bias voltage can be a bias pulse voltage. Controlling the value of the bias voltage, the number of pulse counts, and pulse width can make the conductive particle 104 keep its shape after the conductive particle 104 is firmly attached and also free the probe tip 106 from damage. The bias voltage can be a negative bias voltage. That is, a negative voltage is applied to the probe tip 106, and a positive voltage is applied to the conductive substrate 102. According to the results of experiments, the value of the bias pulse voltage can be in the range from 1 millivolt to 10 volts; the pulse width can be in the range of from 1 nanosecond to 10 seconds. Preferably, in the present embodiment, the value of the bias pulse voltage can be 10-50 millivolts; the pulse width can be 100-1,000 microseconds; and the number of pulse counts can be 10. As such, a gold nanoparticle can be firmly attached to the apex 118 and keep its spherical shape as shown by the arrow in FIG. 3. In addition, the experiments also show that a gold nanoparticle with a diameter of 13 nanometers can be firmly attached to the apex 118, keeping its original spherical shape when a pulse bias voltage is applied at a voltage of from 25 to 50 millivolts, with a pulse of from 20 to 200 nanoseconds.

Figure 2C:
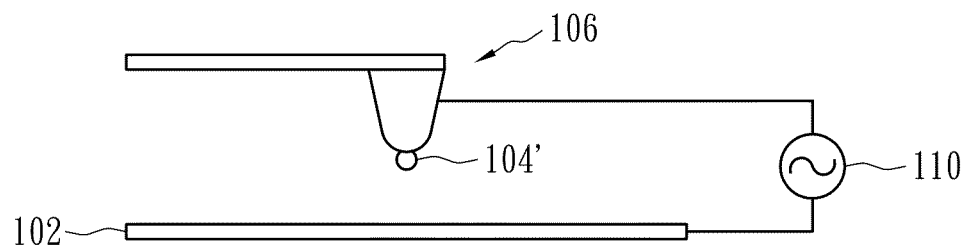
Figure 2D:
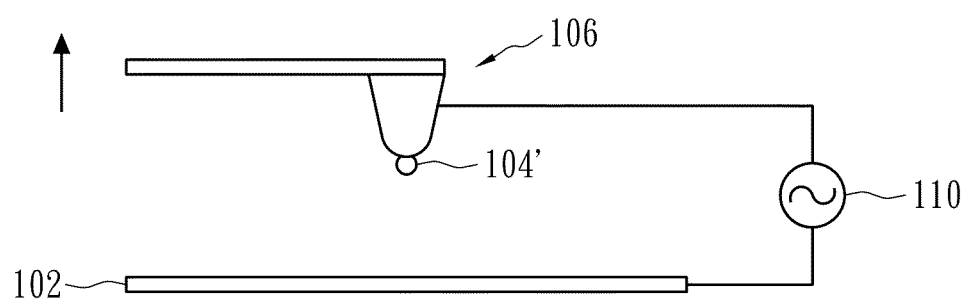

Finally, the probe tip 106 stays in place for a predetermined time after the application of the bias voltage is stopped, and after the predetermined time has elapsed, the probe tip 106 is moved to its original position as shown in FIGS. 2C and 2D. Holding the probe tip 106 in place for a predetermined time can help the conductive particle 104 hold its spherical shape when it is firmly attached to the apex 118, and prevents the conductive particle 104 from being formed as an attached film. In the present embodiment, the predetermined time can be in the range of from 5 to 10 seconds.

Figure 4:
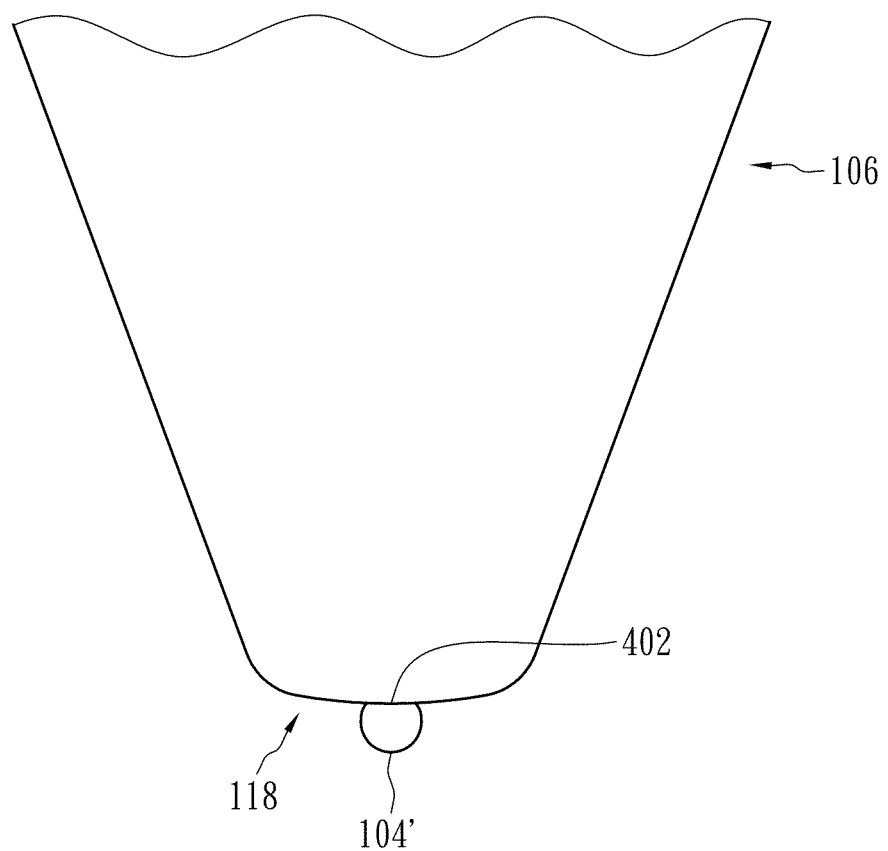
FIG. 4 is a side view showing the attachment between the apex of a probe tip and a conductive particle according to one embodiment of the present invention.

FIG. 4 is a side view showing the attachment between the apex of a probe tip and a conductive particle according to one embodiment of the present invention. Referring to FIGS. 2A to 2D and FIG. 4, the method of the present invention respectively applies voltages of opposite polarities to the apex 118 and the conductive particle 104 so as to cause the conductive particle 104 to be attracted to and firmly attached to the apex 118. When the bias voltage is applied, the probe tip 106 is moved to approach a conductive particle 104, and when the apex 118 is moved sufficiently close to the conductive particle 104, a discharge of static electricity may occur such that the temperature at the interface area is increased so that eutectic bonding occurs at the bonding site 402 between the apex 118 and the conductive particle 104'. The eutectic bonding may occur between the probe tip 106 and the conductive particle 104'; between the metal layer on the probe tip 106 and the conductive particle 104'; and among the probe tip 106, the metal layer on probe tip 106, and the conductive particle 104'. In the present embodiment, after the analysis of the eutectic bond, a gold-silicon alloy eutectic bond is formed between the conductive particle 104' made of gold and the probe tip 106 made of silicon.

Compared with prior art methods, the method of the present invention employs a bias voltage to firmly attach a conductive particle 104 to a probe tip 106. The surface of the probe tip 106 does not need to be treated to have a particle attachable layer so that the configuration of the outer surface of the probe tip 106 does not change. Because there is no requirement for surface treatment of the probe tip 106, complex process steps for surface treatment can be avoided and the manufacturing cost is reduced. The method of the present invention, using an AFM and a bias voltage generating device, can be performed by simple equipments such that the manufacturing cost is low. The method of the present invention controls the apex 118 to directly engage the target conductive particle 104 so that the conductive particle 104 can be correctly attached to the apex 118 of the probe tip 106. However, the prior art methods cannot effectively control a particle to attach to the preferred location so that good yield cannot be achieved.

The above-described embodiments of the present invention are intended to be illustrative only. Numerous alternative embodiments may be devised by persons skilled in the art without departing from the scope of the following claims.

What is claimed is:

1. A method for attaching a conductive particle to the apex of the probe tip of a scanning probe, comprising steps of:
   scanning a surface of a conductive substrate using a probe tip to obtain a surface profile image;
   locating a conductive particle on the conductive substrate by the surface profile image, wherein the conductive particle is a gold, silver, platinum, aluminum, tungsten, nickel, chromium-gold alloy, chromium-cobalt alloy, titanium-platinum alloy, or iridium-platinum alloy particle;
   moving the apex of the probe tip close to the conductive particle; and
   applying a bias voltage between the probe tip and the conductive particle to form eutectic at a bonding site between the probe tip and the conductive particle.

2. The method of claim 1, wherein the step of moving the apex of a probe tip and the step of applying a bias voltage are performed simultaneously.

3. The method of claim 1, wherein the step of applying a bias voltage includes a step of applying a negative voltage to the probe tip and applying a positive voltage to the conductive particle.

4. The method of claim 1, wherein the bias voltage is a bias pulse voltage.

5. The method of claim 4, wherein a value of the bias pulse voltage is in the range from 1 millivolt to 10 volts, and the bias pulse voltage has a pulse width in the range of from 1 nanosecond to 10 seconds.

6. The method of claim 5, wherein the value of the bias pulse voltage is 50 millivolts, the pulse width is 100 microseconds, and the number of pulse counts is 10.

7. The method of claim 1, wherein the step of applying a bias voltage further comprises a step of controlling the time of contact between the probe tip and the conductive particle using a force spectrum.

8. The method of claim 1, further comprising a step of moving the probe tip after a predetermined time starting when the application of the bias voltage is stopped.

9. The method of claim 8, wherein the predetermined time is in the range of from 5 to 10 seconds.

10. The method of claim 1, wherein the bias voltage is applied between the probe tip and the conductive substrate.

11. The method of claim 10, wherein the roughness of the surface is less than one-half of an average particle diameter of the conductive particle.

12. The method of claim 10, wherein the conductive substrate includes a silicon wafer.

13. The method of claim 12, wherein the roughness of the surface is less than 1 nanometer.

14. The method of claim 10, further comprising a step of: moving the probe tip above the conductive particle according to a surface profile image of the surface.

15. The method of claim 1, wherein the conductive particle has a diameter in the range of from 2 nanometers to 10 micrometers.

16. The method of claim 1, wherein the conductive particle has a spherical shape.

17. The method of claim 1, wherein material of the probe tip is silicon or silicon nitride.

18. The method of claim 1, wherein the surface of the probe tip is coated with iridium-platinum alloy layer.

* * * * *